United States Patent Office 3,107,969
Patented Oct. 22, 1963

3,107,969
TREATMENT OF WOOL WITH BENZYL HALIDES IN THE PRESENCE OF DIMETHYLFORMAMIDE
Nathan H. Koenig, Berkeley, Calif., assignor to the United States of America as represented by the Secretary of Agriculture
No Drawing. Filed Aug. 4, 1961, Ser. No. 129,483
7 Claims. (Cl. 8—128)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the modification of wool by reacting it with aromatic alpha-halomethyl derivatives, that is, compounds containing an aromatic nucleus to which is attached a —$CH_2X$ group (X representing a halogen atom). These compounds will be referred to herein for brevity as benzyl halides.

In particular, the invention concerns and has as its primary object the provision of novel processes wherein the reaction of wool with benzyl halides is conducted in the presence of N,N-dimethylformamide (hereinafter termed dimethylformamide) whereby to facilitate and promote the said reaction. Further objects and advantages of the invention will be apparent from the following description wherein parts and percentages are by weight unless otherwise specified.

Prior to this invention it has been advocated that wool be modified by applying a benzyl halide to the wool, followed by baking the treated wool in an oven. In another technique, the wool is heated with a solution of a benzyl halide in an organic solvent such as benzene or carbon tetrachloride. Under these conditions only a minor amount of the benzyl halide actually reacts with the wool so that the degree of modication is very low.

In accordance with the present invention, wool is reacted with a benzyl halide in the presence of dimethylformamide. The latter compound catalyzes the actual chemical combination of the wool and the benzyl halide reactant. As a consequence, one is enabled to readily prepare wools containing substantial proportions of combined benzyl halide with correspondingly improved properties. Prior hereto, pyridine has been employed as a promoter in reacting benzyl halides with compounds containing active hydrogen atoms, i.e., primary amines, thiols, phenols, etc. It has now been established that dimethylformamide is at least as active as pyridine in catalyzing reaction between wool and benzyl halides. Moreover, dimethylformamide is cheaper than pyridine and has a mild odor in contrast to the offensive odor of pyridine. Also, dimethylformamide involves a lesser toxicity problem than pyridine and less fire hazard because of a lower order of vapor pressure. Further, the high boiling point of dimethylformamide (153° C.) makes it possible to conduct the wool-benzyl halide reaction at higher temperatures without requiring pressure-tight vessels or other special apparatus. All of these items indicate that dimethylformamide is a very useful catalyst for the reaction in question and one which involves many advantages over agents previously described.

The unusual and effective action of dimethylformamide as a catalyst for the reaction of benzyl halides with wool is exemplified by the following comparative tests: (a) Dry wool (1.2 g.) and α,o-dichlorotoluene (5 ml.) were heated for 40 minutes at 113° C. The wool was extracted with acetone and ethanol to remove unreacted reagents and dried. It was found that the change in weight of the wool was 0%, indicating that the wool did not react with the α,o-dichlorotoluene. (b) α,o-Dichlorotoluene (2 ml.) and dimethylformamide (3 ml.) were heated with dry wool (1.2 g.) for 30 minutes at 105° C. The wool was extracted as described above and dried. The increase in weight of the wool, due to reaction with α,o-dichlorotoluene, was 8%.

The fact that dimethylformamide acts as a catalyst rather than a mere solvent is demonstrated by the following experimental data: Dry wool flannel (1.2 g.), α,chlorotoluene (1 ml.), and dimethylformamide (5 ml.) were heated for 90 minutes at 105° C. The wool was extracted with acetone and ethanol to remove unreacted reagents and dried. It was found that the increase in weight of the wool, due to reaction with the α-chlorotoluene, was 10%. A series of experiments were then carried out under the same conditions but substituting for the dimethylformamide the same volume of the following solvents: Butyl ether, chlorobenzene, and xylene. In these runs, the increase in weight of the wool was only 2%.

Carrying out the process of the invention essentially involves contacting wool with a benzyl halide in the presence of dimethylformamide. The reaction conditions such as proportion of reagents, specific benzyl halide used, time, temperature, etc., are not critical but may be varied to suit individual circumstances without changing the basic nature of the invention. The proportion of dimethylformamide may be varied widely and may be as low as 0.2 volume per volume of benzyl halide. In the case of benzyl halides which are normally solid, the volume considered is that of the molten (liquefied) compound. Usually, it is preferred to use a larger proportion of dimethylformamide, i.e., about 1 to 5 volumes thereof per volume of benzyl halide, to attain an increased catalytic effect. The temperature of reaction may be about from 25° to 130° C. The reaction rate is increased with increasing temperature and a preferred temperature range to expedite the reaction without damage to the wool is 100–120° C. The effect of temperature on the rate of reaction is illustrated by the following: in a series of runs, α-chlorotoluene (2 ml.) was reacted with dry wool flannel (1.2 g.) in the presence of dimethylformamide (4 ml.) under varying conditions of time and temperature. Uptakes of α-chlorotoluene obtained under these conditions were as follows.

| Reaction conditions: | Uptake,[1] percent |
|---|---|
| 25° C.—3 days | 3 |
| 25° C.—7 days | 5 |
| 60° C.—4 hours | 7 |
| 105° C.—90 minutes | 8 |

[1] Uptake of α-chlorotoluene on wool.

Conventional inert solvents such as xylene, chlorobenzene, or butyl acetate may be added to the reaction system. The use of a solvent is especially indicated where the benzyl halide used is a solid and the proportion of dimethylformamide is not sufficient to dissolve the benzyl halide. It is preferred to carry out the reaction under anhydrous conditions, thereby to ensure reaction between the wool and the benzyl halide but the reaction can also be applied to wool in its normal undried condition (containing about 12–14% water). The degree of modification of the wool is related to the proportion of benzyl halide taken up by the fiber, that is, the higher the uptake of benzyl halide the greater will be the modification of the wool. In general, the uptake of benzyl halide may be varied about from 1 to 15% by weight. In conducting the reaction, the benzyl halide is generally employed in excess over the amount desired to be taken up by the fiber. The time of reaction will vary depending on the proportion of dimethylformamide, temperature of reaction, reactivity of the benzyl halide selected, and the degree of modification desired. In general, the reaction may take anywhere from a few minutes to several hours.

The process in accordance with the invention may be carried out in various ways. For example, the wool may be directly contacted with the dimethylformamide and benzyl halide reactant and the reaction mixture preferably heated as indicated above to cause the benzyl halide to react with the wool. In the alternative, the wool may be pretreated with dimethylformamide and the benzyl halide then added to the mixture and the reaction carried out as previously described. The pretreatment may be carried out at normal temperature or with application of heat, i.e., at 25–130° C.

After reaction of the wool with the benzyl halide, the chemically modified wool is preferably treated to remove excess benzyl halide, reaction byproducts, dimethylformamide, and solvent, if such is used. Thus, the wool may be treated as by wringing, passage through squeeze-rolls, centrifugation, or the like, to remove the excess materials. In place of such mechanical action, or following it, the product may be extracted with an inert volatile solvent such as trichloroethylene, benzene, acetone, carbon tetrachloride, alcohol, etc. Successive extractions with different solvents may be used to ensure complete removal of all unreacted materials. The treated wool is then dried in the usual way.

By treating wool with a benzyl halide as herein described, the wool is chemically modified because there is a chemical reaction between the benzyl halide and the protein molecules of the wool fibers. As a result, the modified wool exhibits advantageous properties over normal wool, as explained below.

The modified wool is more resistant to oxidizing conditions. Such conditions may be encountered in textile mills during bleaching, shrinkproofing, or other finishing processes. Oxidizing environments also occur in use by the action of light and air, and in laundering by bleaching chemicals. The increased resistance to oxidizing conditions has been shown by exposing normal and modified wool samples to solutions of sodium hypochlorite, which is used in commercial bleaches.

The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Although the properties of the modified wool indicate beyond question that actual chemical combination between the wool and the benzyl halide has taken place, it is not known for certain how the wool and benzyl halide moieties are joined. It is believed, however, that the benzyl halide reacts with some of the sites on the wool molecule where there are reactive hydrogen atoms, e.g., amino, guanidino, and thiol groups. It may be, however, that other reactions occur and I do not intend to limit the invention to any theoretical basis.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, rovings, knitted or woven goods, felts, etc. The wool textiles may be of all-wool composition or blends of wool with other textile fibers such as cotton, regenerated cellulose, viscose, animal hair, etc.

The reaction-promoting ability of dimethylformamide is not restricted to any particular benzyl halide or class of benzyl halides. Consequently, the invention may be applied in the reaction of wool with all types of benzyl halides. Thus, generically, the invention may be applied in the reaction of wool with any compound that contains an aromatic nucleus to which is attached a $-CH_2X$ group, wherein X is chlorine, bromine, or iodine. The aromatic nucleus may be a hydrocarbon radical or it may contain substituents such a halogen (chlorine, bromine, iodine, or fluorine), ether groups, ester groups, nitro groups, or additional $-CH_2X$ groups. Illustrative examples of compounds coming into the purview of the invention are: α-chlorotoluene, α-bromotoluene, α-iodotoluene, α,o-dichlorotoluene, α,o-dibromotoluene, α,p-dichlorotoluene, α,p-dibromotoluene, α,m-dichlorotoluene, α,m-dibromotoluene, p-bromo-α-chlorotoluene, p-chloro-α-bromotoluene, α-chloro-m-nitrotoluene, ethyl α-chlorotoluate, α-chloro-p-methoxytoluene, α-chloro-o-xylene, α-chloro-p-xylene, α-chloro-m-xylene, α-bromo-o-xylene, α-bromo-p-xylene, α-bromo-m-xylene, α,α'-dichloro-o-xylene, α,α'-dichloro-p-xylene, α,α'-dichloro-m-xylene, α,α'-dibromo-o-xylene, α,α'-dibromo-p-xylene, α,α'-dibromo-m-xylene, 1-(chloromethyl)naphthalene, 1-(bromomethyl)naphthalene, 2-(chloromethyl)naphthalene, 2-(bromomethyl)naphthalene, chloromethyl methylnaphalenes, bis(chloromethyl)naphthalene, bis(chloromethyl) methylnaphthalenes, chloromethyl nonylbenzene, chloromethyl decylbenzene, bis(chloromethyl) nonylbenzene, bis(chloromethyl) decylbenzene, 1-(chloromethyl)biphenyl, etc.

The invention is further illustrated by the following examples:

Example I

Two 7-gram samples of dried wool flannel were each heated with a mixture of 5 ml. of α-chlorotoluene and 35 ml. of dimethylformamide at 105° C. for times indicated below. The mixture of α-chlorotoluene and dimethylformamide was heated at 105° C. for 20 minutes prior to the time it was added to the wool.

The two samples of treated wool were washed with warm acetone, then extracted with ethanol for 16 hours in a Soxhlet apparatus to remove unreacted reagents. The extracted wool was then dried for 2 to 3 hours in an oven at 105° C. Weighings were then made to determine the uptake of α-chlorotoluene by the wool. The following results were obtained.

| Time of reaction after adding reagents to wool, min.: | Uptake,[1] percent |
| --- | --- |
| 45 | 5 |
| 90 | 8 |

[1] Uptake of α-chlorotoluene.

Example II

A 1.2-gram sample of dried wool flannel was heated with 2 ml. of α,o-dichlorotoluene and 3 ml. of dimethylformamide for 60 minutes at 105° C. The treated wool was extracted as in Example I. The uptake of α,o-dichlorotoluene was 11%.

Example III

Dry wool flannel (1.2 g.) was heated with a solution of p-bromo-α-chlorotoluene (1 g.) in dimethylformamide (6 ml.) for 60 minutes at 105° C. The treated wool was extracted as in Example I. The uptake of p-bromo-α-chlorotoluene was 14%.

Example IV

Two 4-gram samples of dried wool flannel were each heated with a mixture of 5 ml. of α-chloro-p-xylene and 20 ml. of dimethylformamide at 105° C. for times indicated below. The treated wool samples were extracted as in Example I. The following results were obtained.

| Time of reaction, min.: | Uptake,[1] percent |
| --- | --- |
| 30 | 4 |
| 60 | 8 |

[1] Uptake of α-chloro-p-xylene.

Example V

Dry wool flannel (1.2 g.) was heated with a mixture of α-bromotoluene (1 ml.) and dimethylformamide (4 ml.) for 15 minutes at 105° C. The treated wool was extracted as in Example I. The uptake of α-bromotoluene was 11%.

*Example VI*

Two 1.2-gram samples of dried wool flannel were each heated with a mixture of 2 ml. of α-bromotoluene and 4 ml. of dimethylformamide at 60° C. for times indicated below. The treated wool samples were extracted as in Example I. The following results were obtained.

Time of reaction, hr.: Uptake,[1] percent
2.0 ------------------------------------------- 7
4.0 ------------------------------------------- 9

[1] Uptake of α-bromotoluene.

*Example VII*

Dry wool flannel (1.2 g.) was heated with a mixture of 1-(chloromethyl)naphthalene (1 ml.) and dimethylformamide (10 ml.) for 60 minutes at 105° C. The treated wool was extracted as in Example I. The uptake of 1-(chloromethyl)naphthalene was 9%.

*Example VIII*

Two 4-gram samples of dried wool flannel were each heated with a mixture of 5 ml. of chloromethyl methylnaphthalene isomers and 20 ml. of dimethylformamide at 105° C. for times indicated below. The treated wool samples were extracted as in Example I. The following results were obtained.

Time of reaction, min.: Uptake,[1] percent
30 ------------------------------------------- 11
60 ------------------------------------------- 15

[1] Uptake of chloromethyl methylnaphthalene.

*Example IX*

Two 4-gram samples of dried wool flannel were each heated at 105° C. for 60 minutes with a mixture of 25 ml. of dimethylformamide and a number of grams of α,α-dichloro-p-xylene as indicated below. The treated wool samples were extracted as in Example I. The following results were obtained.

Benzyl halide in reaction mixture, grams: Uptake,[1] percent
2 ------------------------------------------- 7
5 ------------------------------------------- 10

[1] Uptake of α,α'-dichloro-p-xylene.

*Example X*

Dry wool flannel (1.2 g.) was heated with a solution of α,α'-dibromo-o-xylene (1 g.) in dimethylformamide (10 ml.) for 30 minutes at 105° C. The treated wool was extracted as in Example I. The uptake of α,α'-dibromo-o-xylene was 8%.

*Example XI*

Two 1.2-gram samples of dried wool flannel were each heated with a solution of 0.5-gram of bis(chloromethyl) alkyl ($C_9$ and $C_{10}$) benzene isomers in 10 ml. of dimethylformamide for times indicated below. The treated wool samples were extracted as in Example I. The following results were obtained.

Time of reaction, hr.: Uptake,[1] percent
30 ------------------------------------------- 7
60 ------------------------------------------- 10

[1] Uptake of bis(chloromethyl) alkylbenzenes.

*Example XII*

Experiments were carried out to determine the resistance of the modified wool samples to the action of aqueous sodium hypochlorite, which is commonly used in bleaches. Samples of treated and untreated wool weighing approximately 0.026 gram each were placed individually in a beaker containing 20 ml. of 1.8% aqueous sodium hypochlorite solution. The solution was stirred thoroughly with a mechanical stirrer and the time required to disintegrate the sample was noted. The results are tabulated below:

| Benzyl halide | Uptake of benzyl halide on wool, percent | Time to disintegrate fabric, min. |
|---|---|---|
| None (untreated wool) | 0 | 6 |
| α-Chloro-p-xylene | 8 | 20 |
| p-Bromo-α-chlorotoluene | 14 | 26 |
| 1-(Chloromethyl)naphthalene | 6 | 17 |
| Chloromethyl methylnaphthalenes | 11 | 26 |
| Bis(chloromethyl) alkylbenzenes | 12 | 27 |

*Example XIII*

To determine shrinkage properties, a measured fabric sample was milled at 1700 r.p.m. for 2 minutes at 40° C. in an "accelerotor" with 0.5% sodium oleate solution, using a liquor-to-wool ratio of 50 to 1. After this laundering operation, the sample was remeasured to determine its area shrinkage. The improvement in shrinkage properties of the wool modified in accordance with the invention is illustrated by the following data:

| Benzyl halide | Uptake of benzyl halide on wool, percent | Area shrinkage, percent |
|---|---|---|
| None (untreated wool) | 0 | 52 |
| Chloromethyl methylnaphthalenes | 14 | 14 |

Having thus described the invention, what is claimed is:

1. A process for chemically modifying wool which comprises reacting wool under essentially anhydrous conditions, with a compound of the formula $$Ar-CH_2X$$

in a reaction mixture comprising said compound and dimethylformamide, wherein Ar represents an aromatic nucleus and X represents a member of the group consisting of chlorine, bromine, and iodine, at a temperature about from 25° C. to 130° C.

2. The process of claim 1 wherein the compound is α-chlorotoluene.

3. The process of claim 1 wherein the compound is α-o-dichlorotoluene.

4. The process of claim 1 wherein the compound is α-chloroxylene.

5. The process of claim 1 wherein the compound is α,α'-dichloroxylene.

6. The process of claim 1 wherein the compound is (chloromethyl)naphthalene.

7. The process of claim 1 wherein the compound is bis(chloromethyl) alkylbenzene.

References Cited in the file of this patent

UNITED STATES PATENTS

| 2,131,146 | Schlack | Sept. 27, 1938 |
| 2,144,824 | Wiegand | Jan. 24, 1939 |
| 2,866,801 | Himel | Dec. 30, 1958 |
| 2,971,024 | Zaugg | Feb. 7, 1961 |
| 2,993,748 | Koenig | July 25, 1961 |

OTHER REFERENCES

Alexander et al.: Wool, Its Chemistry and Physics, pp. 74–79, pub. by Reinhold Publishing Corp., New York city, 1954.